(12) United States Patent
Mathew et al.

(10) Patent No.: US 6,500,913 B2
(45) Date of Patent: Dec. 31, 2002

(54) POLYIMIDES, PROCESS FOR THE PREPARATION THEREOF AND USE THEREOF AS ALIGNMENT FILMS FOR LIQUID CRYSTAL DEVICES

(75) Inventors: Jinu Suju Mathew, Pune (IN); Subhash Pundlik Vernekar, Pune (IN); Reges Mercier, Lyons (FR); Rachid Kerboua, Lyons (FR)

(73) Assignees: Council of Scientific and Industrial Research, New Delhi (IN); Laboratoire des Materiaux Organiques a Proprietes Speciques, Lyons (FR)

( * ) Notice: Subject to any disclaimer, the term of this patent is extended or adjusted under 35 U.S.C. 154(b) by 0 days.

(21) Appl. No.: 09/804,991

(22) Filed: Mar. 13, 2001

(65) Prior Publication Data

US 2002/0142110 A1 Oct. 3, 2002

(51) Int. Cl.$^7$ ............... C08G 73/10; C08G 69/26; C08G 69/28; B32B 27/00
(52) U.S. Cl. ............... 528/170; 528/125; 528/126; 528/128; 528/172; 528/173; 528/176; 528/179; 528/183; 528/185; 528/188; 528/220; 528/229; 528/350; 528/351; 528/353; 428/1.1; 428/1.2; 428/1.26; 428/473.5; 427/162; 427/164; 427/165; 264/299; 264/309; 264/330; 264/331.11
(58) Field of Search ............... 528/170, 353, 528/220, 229, 172, 173, 176, 179, 125, 128, 126, 183, 185, 188; 427/164, 162, 165; 428/1.1, 1.2, 1.26, 473.5; 264/299, 309, 330, 331.11

(56) References Cited

U.S. PATENT DOCUMENTS

| | | | | |
|---|---|---|---|---|
| 4,417,045 A | * | 11/1983 | Nimry et al. | 528/188 |
| 5,608,033 A | * | 3/1997 | Nihira et al. | 528/353 |
| 5,637,772 A | * | 6/1997 | Malek et al. | 564/505 |
| 5,929,201 A | * | 7/1999 | Gibbons et la. | 528/353 |
| 6,111,059 A | * | 8/2000 | Nihira et al. | 528/353 |

* cited by examiner

Primary Examiner—P. Hampton-Hightower
(74) Attorney, Agent, or Firm—Ladas & Parry

(57) ABSTRACT

The present invention relates to a novel polyimide of the general formula (1)

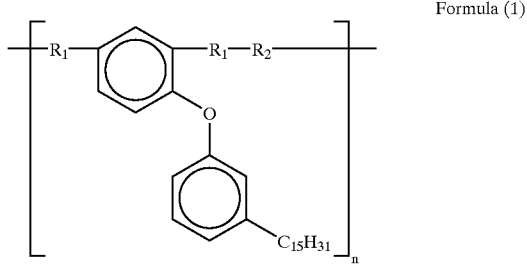

Formula (1)

and a process for the preparation thereof.

27 Claims, No Drawings

POLYIMIDES, PROCESS FOR THE PREPARATION THEREOF AND USE THEREOF AS ALIGNMENT FILMS FOR LIQUID CRYSTAL DEVICES

FIELD OF THE INVENTION

This invention relates to novel polyimides and a process for the preparation thereof More particularly the invention relates to polymides having formula (1)

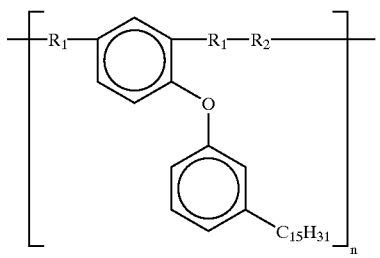

Formula (1)

and a process for their preparation using a renewable resource, Cashew Nut Shell Liquid (CNSL). The polyimides provided by the present invention are useful particularly as alignment films for liquid crystal display devices. The polyimide of formula (1) may be a homo or copolyimide comprising an aromatic diamine having at least one pentadecyl phenoxy group per benzene ring as shown in formula (2)

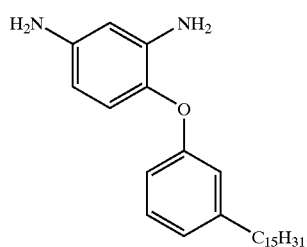

Formula (2)

as the essential diamine component and a tetracarboxylic acid or its derivative ($R_1$) and optionally other common diamines. $R_2$ will be the compound having formula (2) in the case of homopolyimides and will be a common diamine in the case of copolyimides.

BACKGROUND OF THE INVENTION

Polyimides are widely used as protective materials or insulating materials in electric and electronic fields due to their high mechanical strength, heat resistance and solvent resistance. However, developments in electric and electronic fields have been remarkable in recent years, and increasingly high levels of properties have been required for the materials to be used in such fields. Especially for alignment films for liquid crystal display devices, polyimides have heretofore been employed in most cases by virtue of the uniform quality and durability of the coated film surface. However along with the trend for high densification and high performance of display devices, the surface properties of the polyimide coating films have become particularly important, and it has been necessary to impart new properties which conventional polyimides do not have.

Liquid crystal display devices are display devices, which utilize electrooptical changes of liquid crystals, and they are small in size and light in weight and have a feature that their power consumption is small. Accordingly they have found remarkable developments in recent years as display devices for various displays. In certain liquid crystals cells, particularly in those with nematic and cholestric liquid crystals, the cell wall which are in contact with the liquid crystal material must be provided with alignment layers to achieve the desired molecular orientation of the liquid crystals. As a rule, the alignment layers are deposited so that molecules at opposite cell walls lie mutually at 90° C. The alignment layer consists either of inorganic substances deposited by oblique evaporation in a vacuum or of organic substances applied by dipping, brushing, or spraying.

Alignment layers of inorganic materials, such as calcium fluoride or silicon monoxide, are formed by evaporating the substances in a high vacuum at a very small angle to the substrate. Such layers are not suitable for mass production because they require a large amount of work and apparatus.

Alignment layers of organic materials are relatively easy to produce because the organic material, dissolved in a solvent can be applied by dipping, spraying, or brushing. In such layers, the desired molecular orientation is achieved by subjecting the applied material to directional mechanical action, particularly by rubbing the surface in a predetermined direction with a cloth of e.g. nylon, rayon, or polyester. The liquid crystal molecules then align themselves on such a layer by adhering at one end to the organic material. The organic film used may be polyvinyl alcohol, polyoxyethylene, polyamide, or polyimide. However polyimide is commonly used in view of the chemical stability, thermal stability, etc. however, the tilt angle obtainable by rubbing the polyimide is usually at a level from 1° to 3° and it has been difficult to attain a large tilt angle.

In the field of liquid crystal alignment films, it has been difficult to obtain a large tilt angle constantly by rubbing an organic film of polyimide or the like. As a means to solve this problem, Japanese Unexamined Patent Publication No. 297819/1987 discloses a treating agent for liquid crystal alignment comprising of a reaction product of a long chain alkylamine with a polyimide precursor. Further, Japanese Unexamined Patent Publication No. 262527/1989 and No. 262528/1989 disclose an agent for liquid crystal alignment which comprises of a mixture comprising a long chain alkyl compound and a polyimide precursor. Japanese Unexamined Patent Publication No. 25126/1989 discloses a treating agent for liquid crystal alignment which comprises of a polyimide prepared from a diamine having an alkyl group. Thus many attempts have been made to increase the pretilt angle of the liquid crystal by introducing an alkyl group into a polyimide, and it has been possible to increase the tilt angle to some extent. On the other hand, such attempts have resulted in a new problem when an alkyl group is introduced into a polyimide to increase the tilt angle, the wettability of liquid crystal tends to be low, and in an extreme case, the failure in liquid crystal alignment is likely to result. Consequently, the display performance of the liquid crystal display device tends to be poor.

It is therefore necessary to develop a polyimide alignment film, which gives good tilt angle as well as adequate wettability. U.S. Pat. No. 5861534/1999 discloses a polyimide alignment layer prepared from different diamines with long alkyl group and a readily polarizable chemical bond group, which gives good alignment properties.

OBJECTS OF THE INVENTION

The main object of the present invention is therefore to provide novel polyimides and a process for the preparation thereof.

Another object is to provide a process for the preparation of the polyimides, which can be used to synthesize a polyimide liquid crystal alignment layer from a renewable and economically viable resource, cashew nut shell liquid.

SUMMARY OF THE INVENTION

It is observed that reacting a diamine containing at least one mole % of the diaminobenzene derivative of formula (2), which contains a pentadecyl phenoxy group, introduced to the diamine structure from a naturally occurring renewable resource, cashew nut shell liquid and a tetracarboxylic acid or its derivatives ($R_1$), optionally with other common diamines provides a homo or copolyimide having formula (1). $R_2$ is compound having formula (2) in the case of homopolyimides and common diamines in the case of copolyimides. The use of such a diamine, which was synthesized from a naturally occurring renewable and economically viable resource, the cashew nut shell liquid, opens a new route for the production of polyimide having on its side chain, a substituent similar to a liquid crystal molecule and with excellent aligning properties and high solubility in common organic solvents.

Accordingly, the present invention provides a polyimide of the general formula (1)

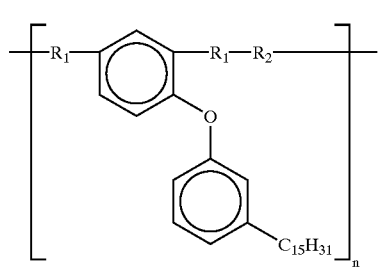

Formula (1)

wherein $R_1$ is a tetracarboxylic acid or a derivative thereof and $R_2$ is a compound of formula 2 or a diamine

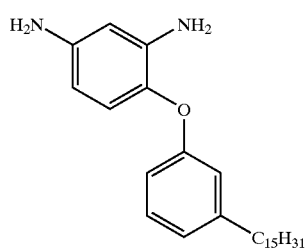

Formula (2)

In one embodiment of the invention, the polyimide of formula 1 is a homo or a copolyimide.

The present invention also provides a process for the preparation of a polyimide of the general formula (1) said process comprising reacting a diamine including an aromatic diamine having at least one pentadecyl phenoxy group per benzene ring of formula (2)

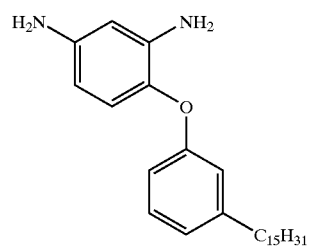

Formula (2)

as the essential diamine component with tetracarboxylic acid or a derivative thereof optionally in the presence of a second diamine in a solvent at a temperature ranging between 120° C. to 220° C. in a stream of inert gas for a period ranging between 6 to 12 hrs, precipitating the resulting polymer in methanol, filtering and drying to obtain the desired polyimide of formula 1.

In yet another embodiment of the invention the solvent used for polymerization is a high temperature solvent selected from nitrobenzene, benzonitrile, α-chloronaphthalene, o-dichlorobenzene, trichlorobenzenes, and phenolic solvents such as m-Cresol, o-Cresol, p-Cresol, o-Cresol, o-Chlorophenol and p-Chlorophenol.

In a further embodiment of the invention, the solvent used for the polymerisation is m-Cresol.

The present invention also relates to a process for the preparation of a polyimide of formula (1) said process comprising reacting a diamine having formula (2)

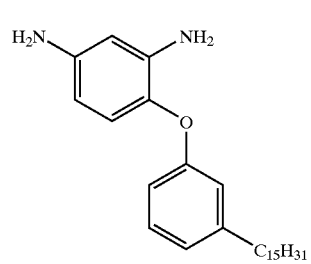

Formula (2)

with a tetracarboxylic acid or a derivative thereof, optionally with a second diamine in a dipolar aprotic amide or sulphoxide solvent at a temperature ranging between 0° C. to 15° C. under a stream of inert gas for a period ranging between 5 to 24 hrs. to obtain a polyimide precursor, imidizing the said polyimide precursor to obtain the desired polyimide.

In one embodiment of the invention, the polyimide precursor is chemically imidized by adding dehydrating agents like acid anhydrides in the presence of tertiary amines and heating at a temperature between 30° C. to 120° C. for 2 to 24 hrs, precipitating the resulting polymer in methanol, filtering and drying to obtain the said polyimide.

In one embodiment of the invention, the polyimide precursor is thermally imidized in the form of a film by coating on a glass substrate and subsequently heating from 100° C. to 400° C.

In another embodiment of the invention, the tetracarboxylic acid and its derivative is selected from pyromellitic acid, 2,3,6,7-naphthalene tetracarboxylic acid, 1,4,5,8-naphthalene tetracarboxylic acid, 1,2,5,6-naphthalene tetracarboxylic acid, 2,3,6,7-anthracene tetracarboxylic acid, 1,2,5,6-anthracene tetracarboxylic acid, 3,3',4,4'-biphenyl tetracarboxylic acid, 2,3,3',4'-biphenyl tetracarboxylic acid, bis(3,4-dicarboxyphenyl)ether, 3,3',4,4'-benzophenone tetracarboxylic acid, bis(3,4-dicarboxyphenyl)sulphone, bis(3,4-dicarboxyphenyl)methane, 2,2-bis (3,4-dicarboxyphenyl)propane, bis (3,4-dicarboxyphenyl)dimethyl silane, 1,1,1,3,3,3-hexafluro-2,2-bis(3,4-dicarboxyphenyl)propane, bis(3,4-dicarboxyphenyl)diphenyl silane, 2,3,4,5-pyridine tetracarboxylic acid and 2,6-bis(3,4-dicarboxyphenyl)pyridine, and their dianhydrides, alicyclic tetracarboxylic acids such as 1,2,3,4-cyclobutane tetracarboxylic acid, 1,2,3,4-cyclopentane tetracarboxylic acid, 1,2,4,5-cyclohexane tetracarboxylic acid, 2,3,5-tricarboxycyclopentylacetic acid and 3,4-dicarboxy -1,2,3,4-tetrahydro-1-naphthalenesuccinic acid, and their dianhydrides.

In another embodiment of the invention the second diamine is selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy -4,4'-diaminobiphenyl, diaminodiphenyl methane, diaminodiphenyl ether, 2,2'-diaminodiphenyl propane, bis(3,5-diethyl-4-aminophenyl)methane, diaminodiphenyl sulphone, diaminobenzophenone, diaminonaphthalene, 1,4-bis(4-aminophenoxy)benzene, 1,4-bis(4-aminophenyl)benzene, 9,10-bis(4-aminophenyl)anthrazene, 1,3-bis(4-aminiophenoxy)benzene, 4,4'-bis(4-aminiophenoxy) diphenyl sulphone, 2,2'-bis[4-(4-aminiophenoxy) phenyl] propane, 2,2' bis(4-aminiophenyl)hexafluropropane and 2,2-bis[4-(4-aminiophenoxy) phenyl]hexafluro propane.

In another embodiment of the invention, the dipolar aprotic solvent used is selected from the group consisting of amide solvents such as N-methylpyrrolidinone, N,N-dimethylacetamide, N,N-dimethyl formamide and tetramethylurea and sulphoxides such as dimethylsulphoxide.

In yet another embodiment of the invention, the dehydrating agent used for chemical imidization is selected from the group consisting of acetic anhydride, propionic anhydride, n-butyric anhydride and benzoic anhydride.

In still another embodiment of the invention, the tertiary amine used for chemical imidization is selected from the group consisting of pyridine, methylpyridines, lutidine, N-methylmorpholine and trialkylamines.

In another embodiment of the invention, the diamine of formula 2 is used singly or two or more in combination.

In a further embodiment of the invention, the tetracarboxylic acid or derivative thereof is used singly or as two or more of in combination.

In a further embodiment of the invention, the ratio of the molar amount of the said tetracarboxylic dianhydride or combination of tetracarboxylic dianhydrides to the molar amount of the said diamine or combination of diamines of formula 2 is between 0.8 to 1.2.

In another embodiment of the invention, the molar amount of tetracarboxylic dianhydride or total molar amount of two or more tetracarboxylic dianhydrides is equal or almost equal to the molar amount of single diamine or total amount of two or more diamines of formula 2.

In another embodiment of the invention, the concentration of the polymer solution is 5 to 40% by weight.

In a further embodiment of the invention, the concentration of the polymer solution is 10 to 25% by weight.

The present invention also relates to a polyimide alignment layer for liquid crystal display devices comprising the polyimide of formula 1.

The present invention also relates to a process for the preparation of a polyimide alignment layer for liquid crystal devices said process comprising spin coating the polyimide of formula 1 dissolved in a suitable common organic solvent on a glass substrate.

In another embodiment of the invention, the polyimide alignment layer for liquid crystal devices is obtained by spin coating the polyimide precursor solution of the polyimide of formula 1 on a glass substrate and heating to form the polyimide film and then subjecting it to rubbing treatment using a polar cloth.

The synthesis of novel polyimides and their application as liquid crystal alignment layers are described herein below with reference to examples, which are illustrative and should not be construed as limiting the scope of the present invention in any manner.

EXAMPLE-1

This Example Illustrates the Process for the Synthesis of Compound Having Formula (2)

3 gm of 2-(3-pentadecyl phenoxy)-1,5-dinitro benzene was dissolved in 100 ml methanol in an autoclave and reduced using Pd/C (0.1 gm) catalyst at 70° C. and 600 psig hydrogen pressure. When the absorption of hydrogen was completed the solution was filtered to remove the catalyst and then methanol was distilled off. The residue was then dissolved in ether and treated with activated charcoal. Then the ether was removed and the residue was recrystallized from petroleum ether (40° C.–60° C.) to obtain 2.23 gm of the diamine. Yield: 86%

EXAMPLE-2

1 g (0.0024 mol) of compound having formula (2) was dissolved in m-Cresol (11.7 ml) and 0.755 (0.0024 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.42 dL/g (concentration: 0.5 g/dL, in chloroform, 30° C.).

EXAMPLE-3

1 g (0.0024 mol) of the compound having formula (2) was dissolved in m-Cresol (11.44 ml) and 0.716 g (0.0024 mol) of 3,3',4,4'-biphenyl tetracarboxylic acid dianhydride was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.49 dL/g (concentration: 0.5 g/dL, in chloroform, 30° C.).

EXAMPLE-4

1 g (0.0024 mol) of compound having formula (2) was dissolved in m-Cresol (11.9 ml) and 0.785 g (0.0024 mol) of 3,3',4,4'-benzophenone tetracarboxylic acid dianhydride was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.53 dL/g (concentration: 0.5 g/dL, in chloroform, 30° C.).

EXAMPLE-5

1 g (0.0024 mol) of compound having formula (2) was dissolved in m-Cresol (11.9 ml) and 1.066 g (0.0024 mol) of 1,1,1,3,3,3-hexafluro-2,2-bis(3,4-dicarboxyphenyl)propane was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.65 dL/g (concentration: 0.5 g/dL, in chloroform, 30° C.).

EXAMPLE-6

1 g (0.0024 mol) of compound having formula (2) was dissolved in m-Cresol (11.9 ml) and 0.6436 g (0.0024 mol) of 1,4,5,8-naphthalenetetracarboxylic acid dianhydride was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.68 dL/g (concentration: 05 g/dL, in chloroform, 30° C.).

EXAMPLE-7

1 g (0.0024 mol) of compound having formula (2) was dissolved in m-Cresol (11.9 ml) and 0.5571 g (0.0024 mol) of 1,2,3,4,-cyclobutanetetracarboxylic acid dianhydride was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.6 dL/g (concentration: 0.5 g/dL, in chloroform, 30° C.).

EXAMPLE-8

1 g (0.0024 mol) of compound having formula (2) was dissolved in m-Cresol (11.9 ml) and 0.8597 g (0.0024 mol) of bis(3,4-dicarboxyphenyl) sulphone was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.5 dL/g (concentration: 0.5 g/dL, in chloroform, 30° C.).

EXAMPLE-9

1 g (0.0024 mol) of compound having formula (2) was dissolved in o-Chlorophenol (11.7 ml) and 0.755 (0.0024 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.45 dL/g (concentration: 0.5 g/dL, in chloroform, 30° C.).

EXAMPLE-10

1 g (0.0024 mol) of the compound having formula (2) was dissolved in o-dichlorobenzene (11.44 ml) and 0.716 g (0.0024 mol) of 3,3',4,4'-biphenyl tetracarboxylic acid dianhydride was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.49 dL/g (concentration: 0.5 g/dL, in chloroform, 30° C.).

EXAMPLE-11

1 g (0.0024 mol) of compound having formula (2) was dissolved in benzonitrile (11.9 ml) and 0.785 g (0.0024 mol) of 3,3',4,4'-benzophenone tetracarboxylic acid dianhydride was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.53 dL/g (concentration: 0.5 g/dL,in chloroform, 30° C.).

EXAMPLE-12

1 g (0.0024 mol) of compound 2 was dissolved in p-Chlorophenol (11.9 ml) and 1.066 g (0.0024 mol) of 1,1,1,3,3,3-hexafluro-2,2-bis(3,4-dicarboxyphenyl)propane was added to this solution with stirring in a steam of nitrogen. The reaction mixture was then heated to 200° C. in a stream of nitrogen for 8 hrs to obtain a viscous polymer solution. The solution was then cooled and the polymer precipitated by adding to methanol. This was then filtered and dried. The inherent viscosity of the polymer solution was 0.65 dL/g (concentration: 0.5 g/dL, in chloroform, 30° C.).

EXAMPLE-13

0.513 g (0.0012 mol) of the compound having formula (2) and 1 g (0.00499 mol) of 4,4'-diaminodiphenyl ether was dissolved in m-Cresol (22.6 ml) and 1.937 g (0.0064 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.65 dL/g (concentration: 0.5 g/dL, in chloroform, 30° C.).

EXAMPLE-14

0.0993 g (0.00024 mol) of the compound having formula (2) and 0.9197 g (0.0046 mol) of 4,4'-diaminodiphenyl ether was dissolved in m-Cresol (16.79 ml) and 1.5 g (0.0048 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.72 dL/g (concentration: 0.5 g/dL, in chloroform, 30° C.).

EXAMPLE-15

0.86 g (0.002 mol) of the compound having formula (2) and 0.42 g (0.002 mol) of 4,4'-phenylenediamine ether was dissolved in m-Cresol (17.2 ml) and 1.3 g (0.004 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.74 dL/g (concentration: 0.5 g/dL, in chloroform, 30° C.).

EXAMPLE-16

0.86 g (0.002 mol) of the compound having formula (2) and 0.2162 g (0.002 mol) of p-phenylenediamine was dissolved in m-Cresol (17.2 ml) and 1.3 g (0.004 mol) of oxy diphthalic dianhydride was added to this solution at room temperature with stirring, in a steam of nitrogen The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.74 dL/g (concentration: 0.5 g/dL, in chloroform, 30° C.).

EXAMPLE-17

0.86 g (0.002 mol) of the compound having formula (2) and 0.3965 g (0.002 mol) of diaminodiphenylmethane was dissolved in m-Cresol (17.2 ml) and 1.3 g (0.004 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.74 dL/g (concentration: 0.5 g/dL, in chloroform, 30° C.).

EXAMPLE-18

0.86 g (0.002 mol) of the compound having formula (2) and 0.4245 g (0.002 mol) of diaminobenzophenone was dissolved in m-Cresol (17.2 ml) and 1.3 g (0.004 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.74 dL/g (concentration: 0.5 g/dL, in chloroform, 30° C.).

EXAMPLE-19

0.86 g (0.002 mol) of the compound having formula (2) and 0.5846 g (0.002 mol) of 1,4-bis (4-aminophenoxy) benzene was dissolved in m-Cresol (17.2 ml) and 1.3 g (0.004 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.74 dL/g (concentration: 0.5 g/dL, in chloroform, 30° C.).

EXAMPLE-20

0.86 g (0.002 mol) of the compound having formula (2) and 0.2162 g (0.002 mol) of p-phenylenediamine was dissolved in o-Chlorophenol (17.2 ml) and 1.3 g (0.004 mol) of oxy diphthalic dianhydride was added to this solution at room temperature with stirring, in a steam of nitrogen. The reaction mixture was then heated to 200° C. in a stream of nitrogen for 8 hrs to obtain a viscous polymer solution. The solution was then cooled and the copolyimide precipitated by adding to methanol. This was then filtered and dried. The inherent viscosity of the polymer solution was 0.74 dL/g (concentration: 0.5 g/dL, in chloroform, 30° C.).

EXAMPLE-21

1 g (0.0024 mol) of the compound having formula (2) was dissolved in N,N-dimethylacetamide (10.2 ml) and 0.531 g (0.0024 mol) of pyromellitic dianhydride was added to this solution with stirring in a steam of nitrogen, at room temperature. The reaction mixture was then stirred under nitrogen atmosphere for 5 hrs and to this was added acetic anhydride (0.27 g) and pyridine (0.13 g). Then the reaction mixture was stirred at room temperature for one hour and then at 40° C. for 3 hrs. The obtained solution was then put into methanol and the precipitated polymer was filtered and dried.

EXAMPLE-22

1 g (0.0024 mol) of the compound having formula (2) was dissolved in N,N-dimethylacetamide (10.2 ml) and 0.785 g (0.0024 mol) of 3,3',4,4'-benzophenone tetracarboxylic acid dianhydride was added to this solution with stirring in a steam of nitrogen, at room temperature. The reaction mixture was then stirred under nitrogen atmosphere for 5 hrs and to this was added acetic anhydride (0.27 g) and pyridine (0.13 g). Then the reaction mixture was stirred at room temperature for one hour and then at 40° C. for 3 hrs. The obtained solution was then put into methanol and the precipitated polymer was filtered and dried.

EXAMPLE-23

1 g (0.0024 mol) of the compound having formula (2) was dissolved in N,N-dimethylformamide (10.2 ml) and 0.531 g (0.0024 mol) of pyromellitic dianhydride was added to this solution with stirring in a steam of nitrogen, at room temperature. The reaction mixture was then stirred under nitrogen atmosphere for 5 hrs and to this was added acetic anhydride (0.27 g) and pyridine (0.13 g). Then the reaction mixture was stirred at room temperature for one hour and then at 40° C. for 3 hrs. The obtained solution was then put into methanol and the precipitated polymer was filtered and dried.

EXAMPLE-24

1 g (0.0024 mol) of the compound having formula (2) was dissolved in N,N-dimethylformamide (10.2 ml) and 0.785 g (0.0024 mol) of 3,3',4,4'-benzophenone tetracarboxylic acid dianhydride was added to this solution with stirring in a steam of nitrogen, at room temperature. The reaction mixture was then stirred under nitrogen atmosphere for 5 hrs and to this was added acetic anhydride (0.27 g) and pyridine (0.13 g). Then the reaction mixture was stirred at room temperature for one hour and then at 40° C. for 3 hrs. The obtained solution was then put into methanol and the precipitated polymer was filtered and dried.

EXAMPLE-25

1 g (0.0024 mol) of the compound having formula (2) was dissolved in N-methylpyrrolidinone (10.2 ml) and 0.531 g (0.0024 mol) of pyromellitic dianhydride was added to this solution with stirring in a steam of nitrogen, at room temperature. The reaction mixture was then stirred under nitrogen atmosphere for 5 hrs and to this was added acetic anhydride (0.27 g) and pyridine (0.13 g). Then the reaction mixture was stirred at room temperature for one hour and then at 40° C. for 3 hrs. The obtained solution was then put into methanol and the precipitated polymer was filtered and dried.

EXAMPLE-26

1 g (0.0024 mol) of the compound having formula (2) was dissolved in N-methylpyrrolidinone (10.2 ml) and 0.785 g (0.0024 mol) of 3,3',4,4'-benzophenone tetracarboxylic acid dianhydride was added to this solution with stirring in a steam of nitrogen, at room temperature. The reaction mixture was then stirred under nitrogen atmosphere for 5 hrs and to this was added acetic anhydride (0.27 g) and pyridine (0.13 g). Then the reaction mixture was stirred at room temperature for one hour and then at 40° C. for 3 hrs. The obtained solution was then put into methanol and the precipitated polymer was filtered and dried.

EXAMPLE-27

1 g (0.0024 mol) of the compound having formula (2) was dissolved in N,N-dimethyl acetamide (10.2 ml) and 0.531 g (0.0024 mol) of pyromellitic dianhydride was added to this solution with stirring in a steam of nitrogen, at room temperature. The reaction mixture was then stirred under nitrogen atmosphere for 24 hrs and the polyimide precursor solution obtained was poured on a glass plate and subsequently heated from 100° C. to 300° C. in an oven in a stream of nitrogen to obtain completely imidized polyimide film.

EXAMPLE-28

1 g (0.0024 mol) of the compound having formula (2) was dissolved in N,N-dimethyl formamide(10.2 ml) and 0.531 g (0.0024 mol) of pyromellitic dianhydride was added to this solution with stirring in a steam of nitrogen, at room temperature. The reaction mixture was then stirred under nitrogen atmosphere for 24 hrs and the polyimide precursor solution obtained was poured on a glass plate and subsequently heated from 100° C. to 300° C. in an oven in a stream of nitrogen to obtain completely imidized polyimide film.

EXAMPLE-29

1 g (0.0024 mol) of the compound having formula (2) was dissolved in N-methylpyrrolidinone(10.2 ml) and 0.531 g (0.0024 mol) of pyromellitic dianhydride was added to this solution with stirring in a steam of nitrogen, at room temperature. The reaction mixture was then stirred under nitrogen atmosphere for 24 hrs and the polyimide precursor solution obtained was poured on a glass plate and subsequently heated from 100° C. to 300° C. in an oven in a stream of nitrogen to obtain completely imidized polyimide film.

EXAMPLE-30

1 g (0.0024 mol) of the compound having formula (2) was dissolved in N,N-dimethyl acetamide (10.2 ml) and 0.785 g (0.0024 mol) of 3,3',4,4'-benzophenone tetracarboxylic acid dianhydride was added to this solution with stirring in a steam of nitrogen, at room temperature. The reaction mixture was then stirred under nitrogen atmosphere for 24 hrs and the polyimide precursor solution obtained was poured on a glass plate and subsequently heated from 100° C. to 300° C. in an oven in a stream of nitrogen to obtain completely imidized polyimide film.

EXAMPLE-31

1 g (0.0024 mol) of the compound having formula (2) was dissolved in N, N-dimethyl formamide (10.2 ml) and 0.785 g (0.0024 mol) of 3,3',4,4'-benzophenone tetracarboxylic acid dianhydride was added to this solution with stirring in a steam of nitrogen, at room temperature. The reaction mixture was then stirred under nitrogen atmosphere for 24 hrs and the polyimide precursor solution obtained was poured on a glass plate and subsequently heated from 100° C. to 300° C. in an oven in a stream of nitrogen to obtain completely imidized polyimide film.

EXAMPLE-32

1 g (0.0024 mol) of the compound having formula (2) was dissolved in N-methylpyrrolidinone (10.2 ml) and 0.785 g (0.0024 mol) of 3,3',4,4'-benzophenone tetracarboxylic acid dianhydride was added to this solution with stirring in a steam of nitrogen, at room temperature. The reaction mixture was then stirred under nitrogen atmosphere for 24 hrs and the polyimide precursor solution obtained was poured on a glass plate and subsequently heated from 100° C. to 300° C. in an oven in a stream of nitrogen to obtain completely imidized polyimide film.

EXAMPLE-33

The polyimides obtained from Examples 1 to 6 were dissolved in trichloroethane and were respectively spin coated at 3500 rpm on glass substrates and then cured at 120° C. for 2 hrs. The polyimides were then rubbed with a rubbing machine using a rayon cloth. Then a pair of the substrates subjected to such rubbing treatment were mounted with anti-parallel rubbing directions, using two 15 $\mu$m Mylar strips along two edges. They were sealed with an epoxy resin. Different liquid crystals were injected into the space to obtain a cell having a homogeneous alignment. With respect to this cell, the pretilt angles were determined by the crystal rotation method in an automated optical bench. The measurements were all performed at room temperature.

TABLE 1

Pretilt angles measured for polyimide obtained in Example 1 with different liquid crystal

| Liquid Crystal | Pretilt angle |
|---|---|
| ZLI1557 | 4.3 |
| ZLI1701 | 3.52 |
| ZLI3201-100 | 3.64 |
| ZLI2806 | 4.11 |
| ZLI2359 | 6.6 |
| TL202 | 2.2 |
| TL205 | 1.25 |
| ZLI3961 | 0.46 |

Advantages of Present Invention

1. Employment of a novel diamine synthesized from a naturally occurring renewable and economically viable resource, the cashew nut shell liquid.
2. The first novel polyimide liquid crystal alignment agent having high pretilt angle and high solubility in common organic solvents obtained from the cashew nut shell liquid.

3. A novel polyimide having on its side chain, a substituent similar to a liquid crystal molecule introduced from cashew nut shell liquid.

We claim:

1. A polyimide with repeating units of the formula (1)

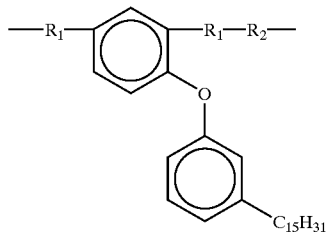

Formula (1)

wherein $R_1$ is a tetracarboxylic acid residue or a derivative thereof and $R_2$ is selected from the residues of a compound of formula 2

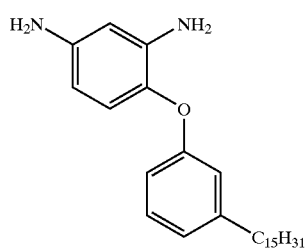

Formula (2)

2. A polyimide as claimed in claim 1 comprising a homo or a copolyimide.

3. A process for the preparation of a polyimide with repeating units of the formula (1):

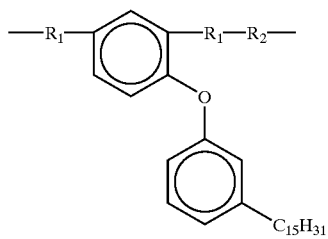

Formula (1)

wherein $R_1$ is a tetracarboxylic acid residue or a derivative thereof and $R_2$ is selected from the residues of a compound of formula 2, said process comprising the steps of:

a) reacting a diamine or an aromatic diamine having at least one pentadecyl group per benzene ring of formula (2)

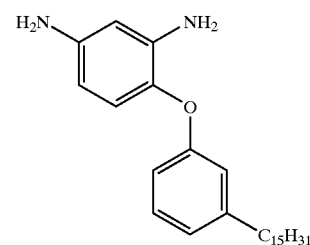

Formula (2)

with tetracarboxylic acid or a derivative thereof optionally in the presence of another diamine in a solvent at a temperature ranging between 120° C. to 220° C. in a stream of inert gas for a period ranging between 6 to 12 hrs;

b) precipitating the resulting polymer in methanol; and c) obtaining the desired polyimide of formula 1.

4. A process as claimed in claim 3 wherein the solvent is selected from nitrobenzene, benzonitrile, α-chloronaphthalene, o-dichlorobenzene, trichlorobenzenes, and phenolic solvents.

5. A process as claimed in claim 4 wherein the solvent used for polymerisation is m-Cresol.

6. A process as claimed in claim 4 wherein the tetracarboxylic acid or derivative thereof is selected from the group consisting of pyromellitic acid, 2,3,6,7- naphthalene tetracarboxylic acid, 1,4,5,8-naphthalene tetracarboxylic acid, 1,2,5,6- naphthalene tetracarboxylic acid, 2,3,6,7-anthracene tetracarboxylic acid, 1 ,2,5,6-anthracene tetracarboxylic acid, 3,3',4,4'- biphenyl tetracarboxylic acid, 2,3,3',4'- biphenyl tetracarboxylic acid, bis(3,4dicarboxyphenyl) other, 3,3',4,4'-benzophenone tetracarboxylic acid, bis(3,4-dicarboxyphenyl) sulphone, bis (3,4-dicarboxyphenyl) methane, 2,2-bis (3,4- dicarboxyphenyl) propane, bis (3,4-dicarboxyphenyl) dimethyl silane, 1,1,1,3,3,3- hexafluro-2,2- bis (3,4-dicarboxyphenyl) propane, bis(3,4-dicarboxyphenyl) diphenylsilane, 2,3,4,5- pyridine tetracarboxylic acid and 2,6- bis(3,4- dicarboxyphenyl) pyridine, and their dianhydrides, alicyclic tetracarboxylic acids and their dianhydrides, and mixtures thereof.

7. A process as claimed in claim 3 wherein the another diamine is selected from the group consisting of p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'- dimethoxy-4,4'-diaminobiphenyl, diaminodiphenyl methane, diaminodiphenyl ether, 2,2'- diaminodiphenyl propane, bis(3,5-diethyl-4-aminophenyl) methane, diaminodiphenyl suiphone, diaminobenzophenone, diaminonaphthalene, 1,4-bis(4-aminophenoxy)benzene, 1,4-bis(4-aminophenyl)benzene, 9,10-bis(4-aminophenyl) anthrazene, 1,3-bis(4-aminiophenoxy) benzene, 4,4'-bis(4-aminiophenoxy) diphenyl sulphone, 2,2'-bis[4-(4- aminiophenoxy) phenyl] propane, 2,2' bis(4-aminiophenyl) hexafluropropane, 2,2'-bis[4-(4- aminiophenoxy) phenyl]hexafluro propane and mixtures thereof.

8. A process for the preparation of a polyimide with repeating units of formula (1):

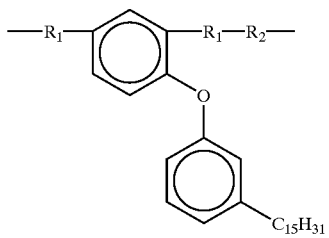

Formula (1)

wherein $R_1$ is a tetracarboxylic acid residue or a derivative thereof and $R_2$ is selected from the residues of a compound of formula 2 or a second diamine, said process comprising the steps of:

a) reacting a diamine having formula (2)

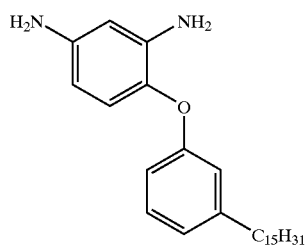

Formula (2)

with tetracarboxylic acid or a derivative thereof, optionally with another diamine in a dipolar aprotic amide or sulphoxide solvent at a temperature ranging between 0° C. to 15° C. under a stream of inert gas for a period ranging between 5 to 24 hrs to obtain a polyimide precursor; and b) imidizing the polyimide precursor to obtain the polyimide of formula 1.

9. A process as claimed in claim 8 wherein the polyimide precursor is chemically imidized by adding dehydrating agents in the presence of tertiary amines and heating at a temperature between 30° C. to 120° C. for 2 to 24 hrs, precipitating the resulting polymer in methanol, filtering and drying to obtain the said polyimide of formula 1.

10. A process as claimed in claim 8 wherein the polyimide precursor is thermally imidized in the form of a film by coating on a glass substrate and subsequently heating from 100° C. to 400° C.

11. A process as claimed in claim 8 wherein the tetracarboxylic acid or derivative thereof is selected from the group consisting of pyromellitic acid, 2,3,6,7- naphthalene tetracarboxylic acid, 1,4,5,8-naphthalene tetracarboxylic acid, 1,2,5,6- naphthalene tetracarboxylic acid, 2,3,6,7-anthracene tetracarboxylic acid, 1,2,5,6-anthracene tetracarboxylic acid, 3,3',4,4'-biphenyl tetracarboxylic acid, 2,3,3', 4'-biphenyl tetracarboxylic acid, bis(3,4-dicarboxyphenyl) ether. 3,3',4,4'-benzophenone tetracarboxylic acid, bis(3, 4dicarboxyphenyl) sulphone, bis(3,4dicarboxyphenyl) methane, 2,2bis (3,4-dicarboxyphenyl) propane, bis (3,4-dicarboxyphenyl) dimethyl silane, 1,1,1,3,3,3- hexafluro 2,2- bis(3,4- dicarboxyphenyl) propane, bis(3,4-dicarboxyphenyl) diphenyl silane, 2,3,4,5- pyridine tetracarboxylic acid and 2,6- bis(3,4-dicarboxyphenyl) pyridine, and their dianhydrides, alicyclic tetracarboxylic acids, their dianhydrides and mixtures thereof.

12. A process as claimed in claim 8 wherein the another diamine is selected from the group consisting of p-phenylenediamine, m-phenylenediamine, 2,5-diaminotoluene, 2,6-diaminotoluene, 4,4'-diamimobiphenyl, 3,3'-dimethyl-4,4'-diaminobiphenyl, 3,3 dimethoxy-4,4'-diaminobiphenyl, diaminodiphenyl methane, diaminodiphenyl ether, 2,2'- diaminodiphenyl propane, bis(3,5-diethyl-4-aminophenyl) mehtane, diaminodiphenyl sulphone, diaminobenzophenone, diaminonaphthalene, 1,4-bis(4-aminophenoxy) benzene, 1,4-bis(4-aminophenyl)benzene, 9,10-bis(4-aminophenyl) anthrazene, 1,3-bis(4-aminiophenoxy) benzene, 4,4'-bis(4-aminophenoxy) diphenyl sulphone, 2,2'-bis[4-(4- amiiophenoxy) phenyl] propane, 2,2'bis(4-aminiophenyl) hexafluropropane 2,2-bis [4-(4- aminiophenoxy) phenyl]hexafluro propane and mixtures thereof.

13. (Amended) A process as claimed in claim 8 wherein the dipolar aprotic solvent is selected from the group consisting of amide solvents such as N-methylpyrrolidinone, N,N- dimethylacetamide, N,N-dimethyl formamide, tetramethylurea, sulphoxides and mixtures thereof.

14. A process as claimed in claim 9 wherein the dehydrating agent is selected from the group consisting of acetic anhydride, propionic anhydride, n-butyric anhydride benzoic anhydride and mixtures thereof.

15. A process as claimed in claim 9 wherein the tertiary amine is selected from the group consisting of pyridine, methylpyridines, lutidine, N-methylmorpholine trialkylamines and mixtures thereof.

16. A process as claimed in claim 9 wherein the aromatic diamine of formula 2 is used singly or two or more in combination.

17. A process as claimed in claim 9 wherein the tetracarboxylic acid or derivative thereof is used singly or two or more in combination.

18. A process as claimed in claim 9 wherein the molar ratio of tetracarboxylic dianhydride or combination of tetracarboxylic dianhydrides to said diamine or combination of diamines is between 0.8 to 1.2.

19. A process as claimed in claim 18 wherein the molar amount of tetracarboxylic dianhydride or total molar amount of two or more tetracarboxylic dianhydrides is equal or almost equal to the molar amount of single aromatic diamine or total amount of two or more aromatic diamines.

20. A process as claimed in claim 9 wherein the concentration of the polymer solution is 5 to 40% by weight.

21. A process as claimed in claim 20 wherein the concentration of the polymer solution is 10 to 25% by weight.

22. A polyimide alignment layer for liquid crystal display devices comprising the polyimide with repeating units of formula 1

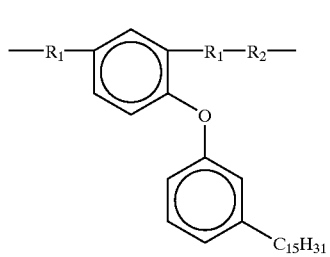

Formula (1)

wherein $R_1$ is a tetracarboxylic acid residue or a derivative thereof and $R_2$ is selected from the residues of a compound of formula 2

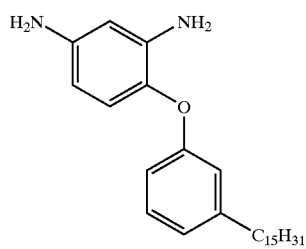

Formula (2)

wherein the aromatic diamine has at least one pentadecyl phenoxy group per benzene ring.

23. A process for the preparation of a polyimide alignment layer for liquid crystal devices said process comprising spin coating the polyimide with repeating units of formula 1

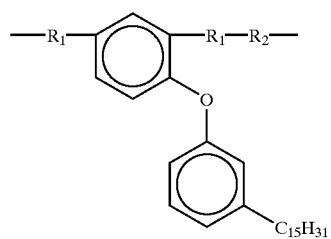

Formula (1)

wherein $R_1$ is a tetracarboxylic acid residue or a derivative thereof and $R_2$ is selected from the residues of a compound of formula 2

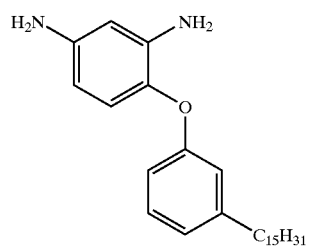

Formula (2)

dissolved in an organic solvent wherein said polyimide of formula (1) is soluble on a glass substrate.

24. A process as claimed in claim 6 wherein the alicyclic tetracarboxylic acid is selected from 1,2,3,4-cyclobutane tetracarboxylic acid, 1,2,3,4-cyclopentane tetracarboxylic acid, 1,2,4,5-cyclohexane tetracarboxylic acid, 2,3,5-tricarboxycyclopentylacetic acid and 3,4-di-carboxy-1,2,3,4-tetrahydro -1- naphthalene-succiic acid.

25. A process as claimed in claim 4 wherein the phenolic solvent is selected from m-Cresol, o-Cresol, p-Cresol, o-Chlorophenol and p-Chlorophenol.

26. A process as claimed in claim 11 wherein the alicyclic tetracarboxylic acid is selected from 1,2,3,4-cyclobutane tetracarboxylic acid, 1,2,3,4-cyclopentane tetracarboxylic acid, 1,2,4,5-cyclohexane tetracarboxylic acid, 2,3,5-tricarboxycyclopentylacetic acid and 3,4-di-carboxy-1,2,3,4-tetrahydro -1- naphthalene-succiic acid.

27. A process as claimed in claim 13 wherein the sulphoxide is dimethylsulphoxide.

* * * * *